DIELECTRIC ISOLATION PROCESSES

Filed Dec. 19, 1968 2 Sheets-Sheet 1

Kenneth E. Bean
Paul S. Gleim,
Inventors.
Koenig, Senniger,
Powers and Leavitt,
Attorneys.

3,738,883

DIELECTRIC ISOLATION PROCESSES

Kenneth E. Bean, Richardson, and Paul S. Gleim, Dallas, Tex., assignors to Texas Instruments Incorporated, Dallas, Tex.

Filed Dec. 19, 1968, Ser. No. 785,244
Int. Cl. H01l 7/50
U.S. Cl. 156—17 1 Claim

ABSTRACT OF THE DISCLOSURE

A process for fabricating dielectrically isolated circuit elements for integrated circuits. An etch-resistant layer of silicon nitride is formed over one surface of a monocrystalline semiconductor substrate and a layer of polycrystalline material is thereafter deposited over the silicon nitride layer. A substantial portion is removed from the other surface of the substrate to leave a relatively thin layer thereof. An etch-resistant mask is then formed on the thereby exposed surface of this remaining thin substrate layer and a pattern of isolation moats is etched through the exposed portions of the substrate layer thereby to form discrete islands each comprising substrate material while the silicon nitride layer is substantially unaffected by the etchant and functions as an etch stop. A dielectric layer is thereafter formed over the exposed surfaces of the islands, and a layer of polycrystalline material is deposited over the dielectric layer. The first polycrystalline material is then removed by etching which exposes the silicon nitride layer which again serves as an etch stop and the monocrystalline islands are dielectrically isolated from each other in a common body of polycrystalline material whereafter the circuit elements are formed in the monocrystalline islands.

This invention relates to semiconductor devices, such as dielectrically isolated integrated circuits and processes of fabricating them.

Dielectric isolation of the circuit elements of an integrated circuit is known to provide numerous advantages, such as improved frequency response, increased voltage and power levels, and improved radiation resistance or tolerance. In certain of the dielectric isolation techniques polycrystalline silicon is utilized with a thin film or layer of silicon dioxide constituting an isolation layer separating each of the elements from the body of polycrystalline silicon. Where polycrystalline silicon is utilized and a layer thereof is removed by etching during the fabrication process, any nonuniformity in the layer thickness due to deposition conditions, slice curvature or bowing will result in nonuniformities in the thickness of certain underlying layers, such as silicon dioxide used conventionally as the separation layer. In subsequent operations such as photolithography for forming openings in a diffusion mask, this nonuniformity in the thickness of the silicon dioxide may cause distortion and nonuniformity in such openings and adversely affect the characteristics of the elements forming the integrated circuit. Also, certain nonuniformities may adversely affect the isolation layer causing deep crevices therein. Such crevices present serious problems during subsequent processing steps and may cause surface irregularities which result in discontinuities or opens in the circuitry during metal deposition steps used in forming leads and interconnections between the elements of the integrated circuit being fabricated.

Among the several objects of this invention may be noted the provision of methods for fabricating dielectrically isolated circuit elements in which problems due to any nonuniformities in layers underlying a deposited polycrystalline layer are eliminated; the provision of such methods in which the integrity of both isolation and separation layers is maintained and crevices therein are avoided; and the provision of methods wherein integrated circuits of higher quality and reliability are conveniently and economically fabricated. Other objects and features will be in part apparent and in part pointed out hereinafter.

Briefly, the methods of the present invention include forming an etch-resistant layer of silicon nitride over one surface of a semiconductor substrate or on the surface of an epitaxial layer first deposited or formed on the substrate. A layer of polycrystalline material is then formed on this silicon nitride layer which constitutes a separation layer. A substantial portion is removed from the other surface of the substrate thereby leaving a relatively thin layer thereof. An etch-resistant mask is then formed on the thereby exposed surface of this remaining thin substrate layer and a pattern of isolation moats is etched through the exposed portions of the thin substrate layer, and the underlying epitaxial layer, if present, thereby forming discrete islands of the substrate material, or plural layer islands of substrate material. As the silicon nitride layer is substantially unaffected by the etchant utilized for etching the single or plural layer substrate material, this silicon nitride layer functions as an etch stop. Dielectric material, such as silicon oxide (or a plural layer composite of silicon oxide and silicon nitride) is formed over the exposed surfaces of the islands. Another layer of polycrystalline material is then deposited over the dielectric material covered discrete islands. The first polycrystalline layer is then removed by etching, while the silicon nitride separation layer again serves as an etch stop and the discrete islands are dielectrically isolated each from all others in a common body of polycrystalline material.

The invention accordingly comprises the methods hereinafter described, the scope of the invention being indicated in the following claims.

In the accompanying drawings, in which several of various possible embodiments of the invention are illustrated, FIGS. 1 and 1A are cross-sections of respective semiconductor substrates utilized as starting materials in the methods of the present invention;

FIG. 1A′ illustrates the substrate of FIG. 1A after an alternate or optional processing step in which certain regions of a conductivity type opposite to that of the substrate are formed;

Figures 1, 1A, 2, 2A, 2B, 3, 3A, 4, 4A, 5, 5A:
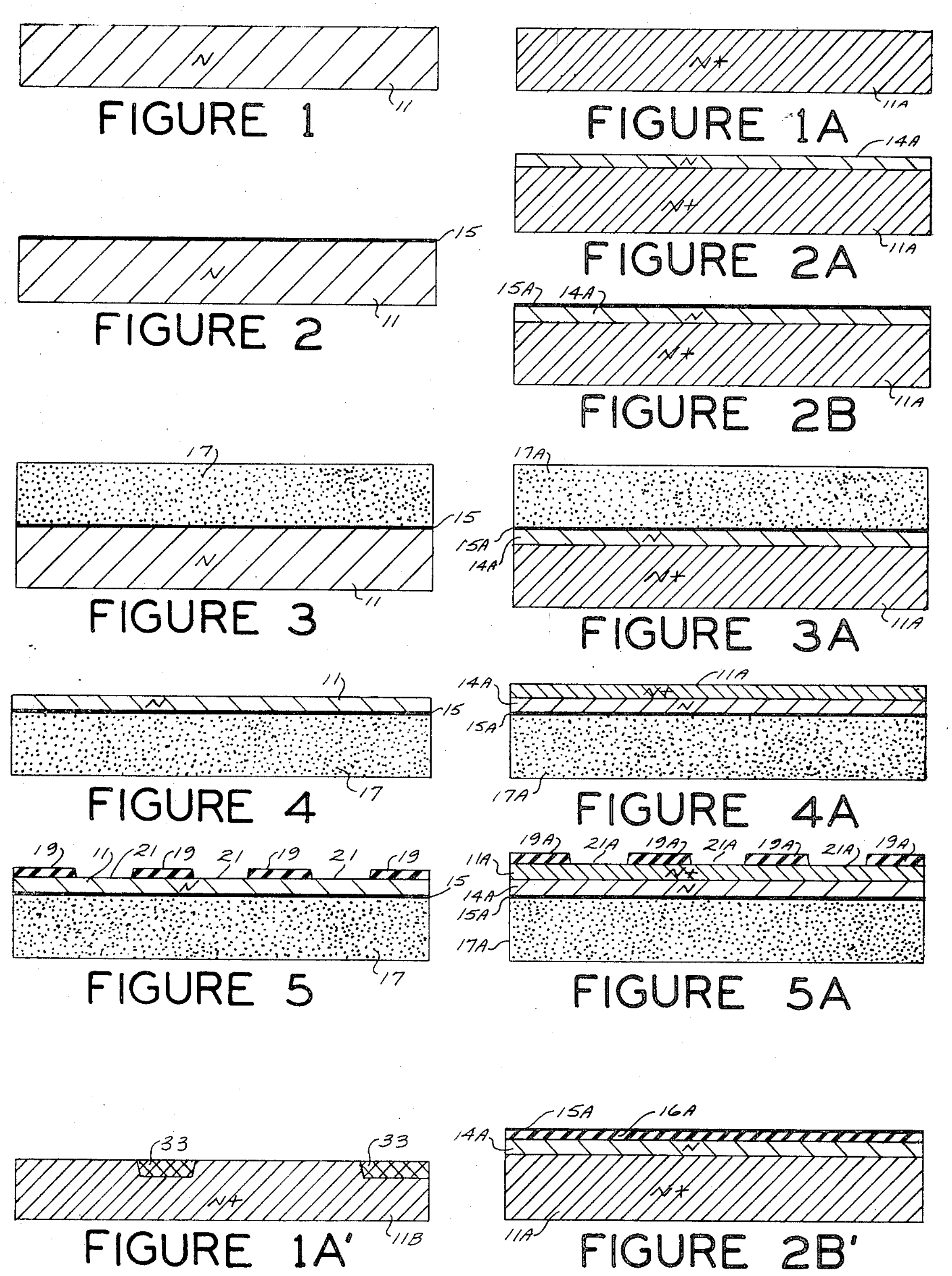
FIG. 2 shows the substrate of FIG. 1 after formation of a separation layer of silicon nitride over one surface thereof.
FIG. 2A shows the substrate of FIG. 1A after forming an epitaxial layer thereon.
FIG. 2B illustrates the FIG. 2A substrate with its epitaxial layer after formation of a separation layer of silicon nitride over the epitaxial layer.
Figure 6:
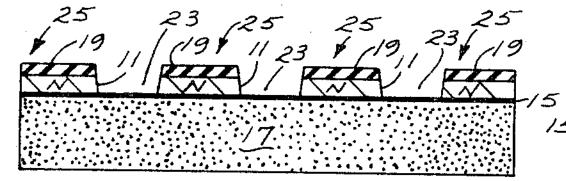
Figure 6A:
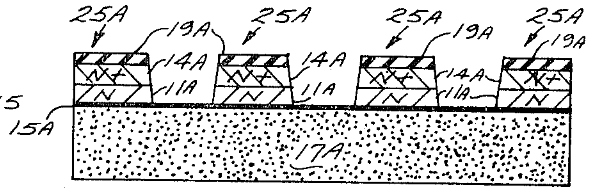
Figure 6:
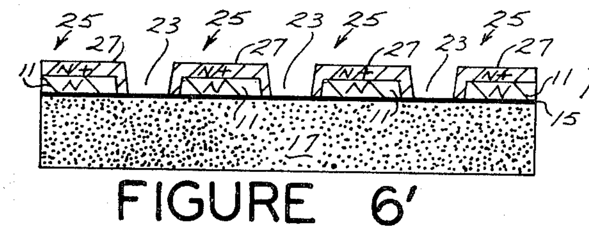
Figure 6A:
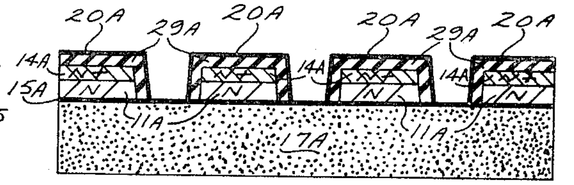
Figure 7:
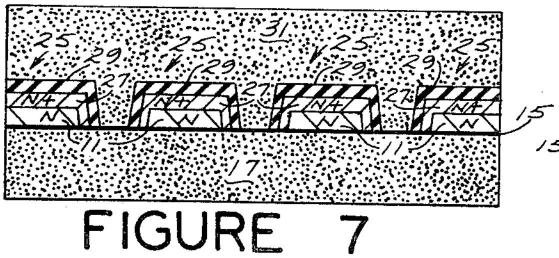
Figure 7A:
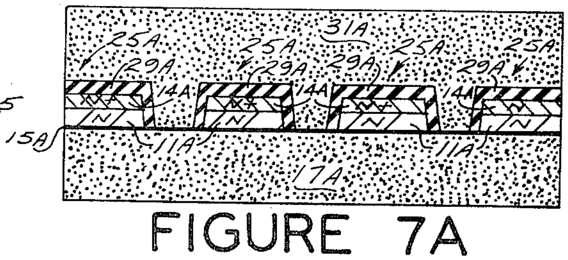
Figure 8:
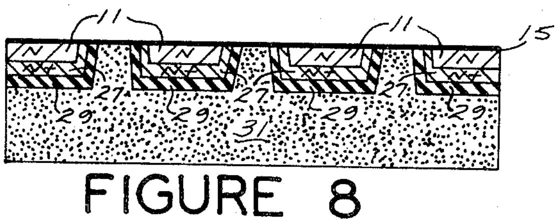
Figure 8A:
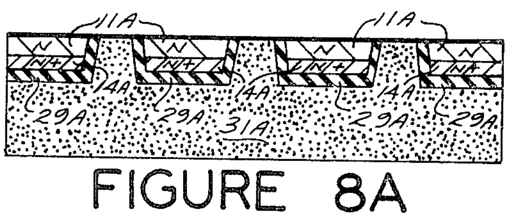
Figure 8:
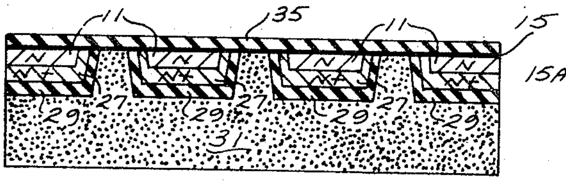
Figure 8A:
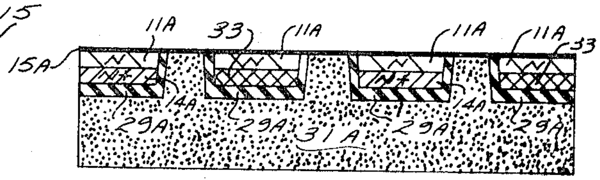

FIG. 2B′ is similar to 2B except the separation layer formed is a two-layer composite of silicon oxide and silicon nitride in an alternate step of this invention;

FIGS. 3 and 3A, respectively, show the layered structures of FIGS. 2 and 2A after deposition of a layer of polycrystalline material thereon;

FIGS. 4 and 4A illustrate a subsequent step in which substantial portions of the other surfaces of the respective substrates of FIGS. 3 and 3A, respectively, have been removed;

FIGS. 5 and 5A show an etch-resistant mask formed on the surface of each of the exposed surfaces of the thin remaining substrate layers of FIGS. 4 and 4A, respectively;

FIGS. 6 and 6A, respectively, illustrate the slices of FIGS. 5 and 5A after etching to form isolation moats;

FIG. 6′ shows the slice of FIG. 6 after a heavily doped layer is formed on the exposed surface of the substrate of the FIG. 6 structure;

FIG. 6A′ illustrates the slice of FIG. 6A after an alternate step wherein a composite two-layer isolation layer of silicon dioxide and silicon nitride is formed;

FIGS. 7 and 7A, respectively, show the slices of FIGS. 6′ and 6A following a further deposition of polycrystalline material;

FIGS. 8 and 8A illustrate the structures of FIGS. 7 and 7A after an etching step to remove the first deposited polycrystalline layer;

FIG. 8′ shows the FIG. 8 slice after another alternate step in which a layer of silicon oxide is formed over the silicon nitride separation layer; and FIG. 8A′ illustrates a structure similar to that of FIG. 8A, but showing the results of using the starting material of FIG. 1A′.

Corresponding reference characters indicate corresponding parts throughout the several views of the drawings.

Referring now to the drawings, the starting material for one method of the present invention is indicated generally at reference numeral 11 and constitutes a semiconductor slice or substrate such as lightly doped N-type monocrystalline silicon.

FIG. 2 shows the FIG. 1 slice after the first step of forming a thin film or layer 15 of silicon nitride on the upper surface thereof using any conventional vapor deposition techniques known to those skilled in this field. The thickness of this silicon nitride film may be in the order of 2000 A. and it constitutes a separation layer advantageously utilized in subsequent processing steps.

In FIG. 3 a layer 17 of polycrystalline silicon is formed by customary deposition procedures on the silicon nitride layer 15, an example of thickness of this layer being in the order of about 10 to 14 mils.

In the next step, as illustrated in FIG. 4, a substantial portion of the other or bottom (as viewed in FIG. 1) surface of substrate 11 is conventionally physically removed, such as by grinding or lapping to leave a relatively thin layer of substrate 11 which is a predetermined thickness, for example, 2 mils. This remaining portion of substrate 11 is shown as the top layer in FIG. 4 and thus indicates the inverted position of the slice relative to that shown in the preceding figures.

Referring to FIG. 5, an etch-resistant mask 19 (of silicon dioxide, for example) is conventionally formed on the exposed or upper surface of the thin substrate layer 11, leaving a grid pattern of open strips 21. An etching step, using conventional vapor or liquid phase techniques is performed and as illustrated in FIG. 6 a grid pattern of isolation moats 23 is formed, leaving a plurality of generally rectangular shaped discrete monocrystalline islands 25. The etchant attacks and removes the portions of silicon substrate 11 not covered by mask 19, but does not significantly affect or attack the silicon nitride separation layer 15, which serves as an etch stop for forming all the moats. The use of silicon nitride instead of silicon oxide as a separation layer 15 is markedly advantageous inasmuch as the silicon etchant would attack the silicon oxide and tend to form irregularities in the upper (FIG. 6) surface of a silicon oxide separation layer. Such irregularities cause serious problems during subsequent fabrication techniques and in the finished integrated circuits, as will be explained more fully hereinafter.

In FIG. 6′ the mask 19 has been removed by customary stripping procedures and the exposed surfaces of the discrete islands 25 have formed thereon a surface layer of a relatively heavily doped $n+$ layer 27 by customary diffusion procedures or by vapor phase deposition. FIG. 7 shows a subsequent step in which a thin dielectric isolation layer 29, such as silicon oxide, is formed over the exposed surfaces of islands 25 in a customary manner, and then another layer 31 of polycrystalline silicon is formed (e.g., 10 or so mils thick) over the isolation layer covered discrete islands 25. The silicon oxide layers 29 do not form or grow in the bottoms of the moats as these are exposed surfaces of the silicon nitride separation layer 15.

As shown in FIG. 8 (inverted relative to FIG. 7), the first polycrystalline layer 17 is removed, at least the last portion of the removal being accomplished by any conventional silicon etchant. As the silicon nitride is not significantly attacked by this etchant, the separation layer 15 serves as an etch stop, insuring that the upper (FIG. 8) edges of isolation layer 29 abutting separation layer 15 retain their integrity and are not attacked by the last etchant. Silicon oxide, if used as a separation layer, would be susceptible to etchant attack during removal of this first polycrystalline layer and nonuniformity in the thickness of such a silicon oxide separation layer would result. If such a separation layer were removed to avoid the irregularities, the etchant used to remove it would attack the upper ends of the isolation layer portions and cause the formation of crevices therein. During subsequent conventional steps of fabrication of the individual circuit elements, such layer nonuniformities and crevices would cause serious problems. For example, during subsequent photolithographic procedures the nonuniformities would cause difficulties in that the etch front would move laterally in the thinner portions of the layer underlying the edges of masked portions and thus create nonuniform diffusion windows (for subsequent base and emitter formations, etc). in such a layer. This would adversely affect the characteristics of the individual circuit elements. Such crevices which would be formed in the isolation layer edges would create opens in the metallized interconnect patterns used in interconnecting various of the elements.

It is significant to note that one surface of the silicon nitride separtion layer 15 functions as an etch stop in the method step exemplified in FIG. 6 and the other surface thereof functions as an etch stop in the FIG. 8 step. In the former instance the use of silicon nitride as a separation layer is additionally advantageous over silicon oxide inasmuch as the latter, being more subject to the attack of etchants for silicon, would be subject to the formation of crevices in its upper (FIG. 6) surface and when a second layer of polycrystalline silicon is deposited it would fill these crevices and cause the formation of ridges that would project upwardly (FIG. 8) after removal of the separation layer and thus make it difficult to obtain and maintain continuity in interconnecting leads formed during subsequent metallization.

Another method of this invention is illustrated in FIGS. 1A through 8A. In this instance the starting material is a semiconductor slice or substrate 11A of relatively heavily doped (about $10^{19}$ to $10^{21}$ atoms/cm.$^3$) N-type silicon having a typical resistivity of about .008 to .02 ohm-cm. Generally the reference numerals used in describing this second process embodiment are the same as those used in the first embodiment description except they are followed by the letter A and refer to features which are structurally and functionally similar to those in the above-described method. In FIG. 2A a further or additional step is illustrated, viz, forming an epitaxial layer 14A on the upper surface of substrate 11A by customary epitaxial procedures. This layer is approximately .25 mil thick, for example, and is relatively lightly n-doped having a resistivity in the order of .3 ohm-cm., for example. This epitaxial layer 14A is therefore formed prior to the formation of the silicon nitride separation layer 15A as illustrated in FIG. 2B. The steps of this alternate method proceed as illustrated in FIGS. 3A through 6A, 7A and 8A and correspond to those of FIGS. 3 through 6, 7 and 8, except that the epitaxial layer 14A is interposed between the substrate 11A and the silicon nitride separation layer 15A instead of having the separation layer directly formed on the substrate as in the first method described. Again two-layer discrete islands 25A are formed as illustrated in FIG. 8A. It should be that that the silicon oxide mask areas 19A in FIG. 6A may either be stripped off prior to the forming of the dielectric isolation layer 29A, or they may be left in place. Thus isolation layer 29A (FIG. 7A) may include the silicon oxide mask portions 19A. In either instance the silicon oxide covering of each island constitutes the dielectric isolating medium.

Another alternative step of the methods of this invention is illustrated in FIG. 2B' wherein a silicon oxide layer 16A is first formed on the epitaxial layer 14A before forming the silicon nitride separation layer 15A. Such a a two-layer composite separation layer is particularly advantageous if it is desired to utilize the protective properties of the silicon nitride layer 15A in subsequent device fabrications as this thin layer 16A will there serve to prevent the formation of accumulation or inversion layers. Preferably, but not necesarily, this silicon dioxide layer 16A and the silicon nitride layer 15A could be grown in situ following the epitaxial layer formation followed by in situ deposition of the silicon nitride film or layer all within the same epitaxial reactor. Such in situ deposition results in particularly excellent continuity in the films of silicon dioxide and silicon nitride thereby further minimizing defects (pinholes or conductive paths) which is desirable for obtaining a high yield integrated circuit operation. Optionally a further silicon oxide layer may be formed on the surface of silicon nitride layer 15A thereby providing a three-layer composite separation layer. Silicon oxide may be formed on the surface of a silicon nitride layer in accordance with an aspect of the invention by forming a thin layer of polycrystalline silicon on the surface of the silicon nitride layer and then thermally oxidizing it in situ to form the layer of silicon oxide or the silicon oxide may be deposited directly on the silicon nitride layers by conventional vapor deposition techniques using the silane and oxygen.

In a somewhat like manner a two-layer composite isolation layer may be formed over islands 25A, as illustrated in FIG. 6A'. In this alternative step a layer 20A of silicon nitride is deposited over the silicon dioxide layer 29A prior to the formation of the second polycrystalline silicon layer 31A. This composite two-layer isolation layer permits the use of a thinner silicon dioxide layer 29A and thereby markedly reduces the time required to thermally grow this silicon dioxide layer. For example, layer 29A can be only 5000 A. thick and then a relatively thin layer or film 2KA. of silicon nitride can be formed thereover to provide dielectric isolation as effective as a much thicker isolation layer of only siliocn dioxide. Also, such a composite isolation layer minimizes possible defects or pinholes through the isolation layer and assures a continuous impervious layer. Also, the composite isolation layer allows less high temperature processing time with respect to an all silicon oxide isolation layer and consequently preserves the sharp NN+interface characteristic.

A further embodiment of the present invention is illustrated in FIG. 1A' in which the starting material is a slice 11B of relatively heavily doped n-type single crystal silicon in which spaced apart p or p+regions 33 are formed for instance by diffusion in a conventional manner. By carrying out the above-described process steps as exemplified in FIGS. 1A through 8A, a structure as illustrated in FIG. 8A' will result. The regions 33 constitute the lower layer of alternate discrete two-layer islands, the top layer being formed of portions of the n-type epitaxial layer 14B. The lower layers of the alternate islands are constituted by portions of the *n*+ substrate 11B. This structure of FIG. 8A' is ideal for convenient subsequent formation of complementary NPN and PNP devices in the final integrated circuit.

The several structures of FIGS. 8, 8A and 8A' with their overlying silicon nitride layer and the discrete dielectrically isolated islands may then be subjected to conventional photolithography, diffusions, metallization, etc., to form the particular desired integrated circuit units. The silicon nitride layer itself, which can be conveniently etched by hot phosphoric acid but is inert in silicon etchants, may be utilized as a mask for such subsequent fabrication procedures, after providing the desired windows and patterns. In certain instances it may be desirable to provide a layer of silicon dioxide over the silicon nitride layer. This is illustrated in FIG. 8' wherein such a silicon dioxide layer is indicated at 35.

It will be understood that the thicknesses of the various layers as illustrated in the drawings are merely representative and are not relative or scaled inasmuch as the various actual layer thicknesses and substrate dimensions vary from only a few thousand A. to 10 mils or more and therefore cannot be shown to scale or even proportioned relative to each other.

It is to be understood that the described embodiments are merely illustrative of the invention. Numerous other arrangements may be devised by those skilled in the art without departing from the spirit and scope of the invention as defined by the appended claims.

What is claimed is:

1. In a method of making an integrated circuit the steps of: forming a layer of etch-resistant silicon nitride material at a location intermediate a first layer of polycrystalline silicon material and a second layer of monocrystalline silicon material, selectively etching said second layer with an etchant that does not attack said etch-resistant layer to any appreciable degree, until one surface of said etch-resistant layer stops further etching leaving a plurality of monocrystalline silicon islands of said second layer, covering said monocrystalline silicon islands with dielectric material, depositing polycrystalline silicon material over said dielectric material and etching with an etchant that does not attack said etch resistant layer to any appreciable degree, said first polycrystalline silicon layer until the other surface of said etch-resistant layer stops further etching.

References Cited

UNITED STATES PATENTS

| | | | |
|---|---|---|---|
| 3,385,729 | 5/1968 | Larchian | 117—200 |
| 3,460,007 | 8/1969 | Scott | 317—235 |

OTHER REFERENCES

I.B.M. Tech. Disclosure Bulletin—Masking Technique—Dhaka et al., p. 864, and I.B.M. Tech. Disclosure Bulletin—Contact Opening—Anantha, p. 857; both in vol. 11, No. 7, December 1968.

JACOB H. STEINBERG, Primary Examiner

U.S. Cl. X.R.

156—13; 317—235 F